US012236701B2

(12) United States Patent
Jeon (10) Patent No.: US 12,236,701 B2
(45) Date of Patent: Feb. 25, 2025

(54) ANIMAL OBJECT IDENTIFICATION APPARATUS BASED ON IMAGE AND METHOD THEREOF

(71) Applicant: INTFLOW INC., Gwangju (KR)

(72) Inventor: Kwang Myung Jeon, Gwangju (KR)

(73) Assignee: INTFLOW INC., Gwangju (KR)

( * ) Notice: Subject to any disclaimer, the term of this patent is extended or adjusted under 35 U.S.C. 154(b) by 422 days.

(21) Appl. No.: 17/702,423

(22) Filed: Mar. 23, 2022

(65) Prior Publication Data

US 2023/0206678 A1 Jun. 29, 2023

(30) Foreign Application Priority Data

Dec. 29, 2021 (KR) .................. 10-2021-0190952

(51) Int. Cl.
*G06V 40/10* (2022.01)
*G06V 10/40* (2022.01)
*G06V 10/74* (2022.01)
*G06V 10/762* (2022.01)
*G06V 10/764* (2022.01)
*G06V 10/776* (2022.01)
*G06V 10/82* (2022.01)

(52) U.S. Cl.
CPC .............. *G06V 40/10* (2022.01); *G06V 10/40* (2022.01); *G06V 10/761* (2022.01); *G06V 10/763* (2022.01); *G06V 10/764* (2022.01); *G06V 10/776* (2022.01); *G06V 10/82* (2022.01)

(58) Field of Classification Search
None
See application file for complete search history.

(56) References Cited

U.S. PATENT DOCUMENTS

| 2021/0153479 A1* | 5/2021 | Mindel | ................. G06V 10/22 |
| 2021/0241091 A1* | 8/2021 | Neumann | ............. G06N 3/061 |

FOREIGN PATENT DOCUMENTS

| JP | 2016066114 A | 4/2016 |
| KR | 20130083997 A | 7/2013 |
| KR | 20200044209 A | 4/2020 |

* cited by examiner

*Primary Examiner* — Lennin R Rodriguezgonzalez
(74) *Attorney, Agent, or Firm* — CANTOR COLBURN LLP (57) ABSTRACT

An animal object identification apparatus includes a memory storing a program for identifying an animal object based on the image, and a processor configured to identify the animal object based on the image by executing the program, wherein the processor detects specific body images of animal objects imaged in an input image as object regions to set the specific body images as input data, extracts flattened features for the input data by inputting the input data to a preset flattened-feature calculation model, generates clustering data by performing clustering for the flattened features and assigning identifiers for classifying the animal objects to at least one cluster, and assigns the identifiers to animal objects included in the object regions by comparing the flattened features calculated during extracting the flattened features with the clustering data.

15 Claims, 5 Drawing Sheets

ANIMAL OBJECT IDENTIFICATION APPARATUS BASED ON IMAGE AND METHOD THEREOF

BACKGROUND

1. Technical Field

The present disclosure relates to an apparatus for identifying an animal in another image by recognizing a specific body of the animal in the image and extracting feature points thereof based on artificial intelligence and clustering the extracted feature points.

2. Related Art

In the related art, technology for unique identification of animals uses blood vessel imaging, iris recognition, inscription recognition, and so on. The recognition technology of the related art has a common feature of identifying unique information formed in a local area after a camera images the local area (capillaries, iris, inscriptions, and so on) formed in a unique pattern that an animal has biologically.

The recognition technology of the related art requires a specific method or apparatus for imaging because analysis may be made only by accurately imaging a local area. In addition, in order to safely image animals, measures have to be taken so as not to disturb imaging when a professional person such as a veterinarian comes into close contact with animals, immobilizes animal, or performs anesthesia. For this reason, the recognition technology of the related art may be useful in a place where a single object such as a companion animal is managed or a zoo. However, there is a disadvantage in that it is difficult to apply the recognition technology of the related art to livestock raised in a group in a specific area, such as cattle or pigs.

In addition, face identification technology used for people may identify a large number of people in a non-contact state, and thus, the face identification technology is being used in various fields such as security, access control, and payment.

In this case, the face recognition technology for people uses a single identification method or so on for distinguishing people standing close to a camera one by one, and research on pig face recognition technology to be applied to animals is in progress.

However, in reality, it is difficult to apply face identification for animals. This is because animals do not intentionally adjust their bodies for imaging by a camera in order to reveal their facial features, unlike human.

Therefore, development of new technology for identifying a number of livestock, which is different from the recognition technology of the related art described above, is required.

SUMMARY

The present disclosure provides a system for identifying animal objects imaged by a camera by using artificial intelligence. Specifically, the system calculates and clusters imaged features of a specific body of an animal, and then compares the imaged features of an animal body with clustered data, thereby identifying the animal.

This allows the system to identify animals based on their appearances, even when animals of the same species are clustered in a specific region.

According to an aspect of the present disclosure, an animal object identification apparatus based on an image may include a memory storing a program for identifying an animal object based on the image, and a processor configured to identify the animal object based on the image by executing the program stored in the memory, wherein the processor may detect specific body images of animal objects imaged in an input image as object regions to set the specific body images as input data, extract flattened features for the input data by inputting the input data to a preset flattened-feature calculation model, generate clustering data by performing clustering for the flattened features and assigning identifiers for classifying the animal objects to at least one cluster, and assign the identifiers to animal objects included in the object regions by comparing the flattened features calculated during extracting the flattened features with the clustering data, and the flattened-feature calculation model may be a model for performing artificial intelligence learning based on the object regions of the animal objects and extracting the flattened features for classifying the animal objects through the object regions.

In addition, the object regions may be generated by recognizing the specific body images of the animal objects from the input image based on artificial intelligence and setting a segmentation.

In addition, before the flattened features are extracted, the object region for each frame included in the input data may be input to a convolutional neural network (CNN), and the flattened-feature calculation model for extracting the flattened features corresponding to the object regions for each frame and inferring a certain identifier for each animal object may be constructed.

In addition, in a process of constructing the flattened-feature calculation model, when a loss value of a loss function between a correct answer identifier and an estimated identifier among random identifiers assigned to the flattened features of the object regions for each frame is less than or equal to a preset threshold, learning may be ended.

In addition, the loss value may be calculated by applying any one of categorical cross-entropy loss, focal loss, and additive angular margin loss that is usable for multiclass classes to the loss function between the correct answer identifier and the estimated identifier.

In addition, in a process of generating the clustering data, when a number of the animal objects imaged in the input image is determined, clustering may be performed through k-means clustering.

In addition, in a process of generating the clustering data, when a number of the animal objects imaged in the input image is not determined, clustering may be performed through mean-shift clustering.

In addition, in a process of assigning the identifiers to the animal objects, an identifier of a cluster with a highest similarity within a threshold among similarities between the flattened feature included in the clustering data and the flattened feature of the input data may be set as an identifier for the input data.

In addition, in a process of assigning the identifiers to the animal objects, when similarity between the flattened feature included in the clustering data and the flattened feature of the input data exceeds a threshold, a new identifier for the input data may be generated, and a cluster of flattened features may be generated based on the identifier.

According to another aspect of the present disclosure, an animal object identification method based on an image may include detecting specific body images of animal objects imaged in an input image as object regions to set the specific body images as input data, extracting flattened features for the input data by inputting the input data to a preset flattened-feature calculation model, generating clustering data by performing clustering for the flattened features and assigning identifiers for classifying the animal objects to at least one cluster, and assigning the identifiers to animal objects included in the object regions by comparing the flattened features calculated during extracting the flattened features with the clustering data, wherein the flattened-feature calculation model may be a model for performing artificial intelligence learning based on the object regions of the animal objects and extracting the flattened features for classifying the animal objects through the object regions.

According to another aspect of the present disclosure, a computer-readable storage medium may store a program for performing the animal object identification method described above.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Hereinafter, embodiments of the present disclosure will be described in detail with reference to the accompanying drawings such that those skilled in the art may easily implement the present disclosure. However, the present disclosure may be embodied in several different forms and is not limited to the embodiments described herein. In order to clearly describe the present disclosure in the drawings, parts irrelevant to the description are omitted, and similar reference numerals are attached to similar portions throughout the specification.

Throughout the specification, when a portion is "connected" to another portion, this includes not only a case of being "directly connected" thereto but also a case of being "electrically connected" thereto with another element interposed therebetween. In addition, when a portion "includes" a component, this means that another component may be further included therein, rather than excluding another component, unless otherwise stated, and it should be understood that existence or addition of one or more other features numbers, steps, operations, configuration elements, components, or combinations thereof is not precluded in advance.

The following embodiments provide detailed descriptions to help understanding of the present disclosure and do not limit the scope of the present disclosure. Accordingly, inventions of the same scope for performing the same function as the present disclosure will also fall within the scope of the present disclosure.

Figure 1:
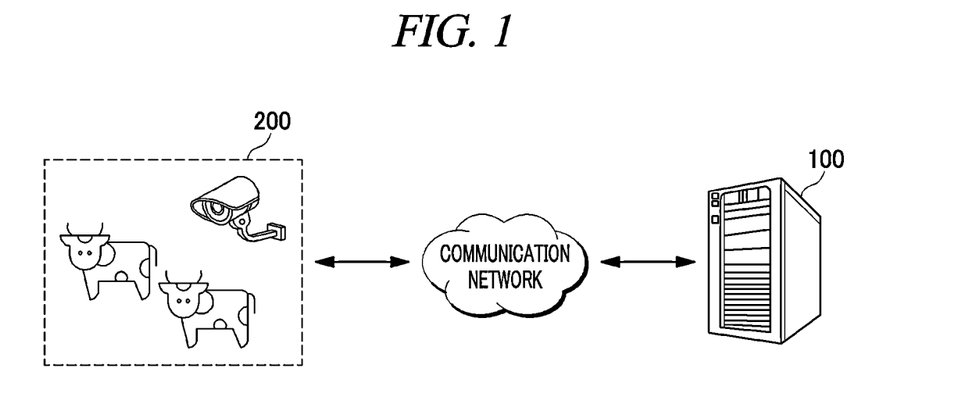
FIG. 1 is a diagram illustrating a configuration of an image-based animal object identification system according to an embodiment of the present disclosure.

FIG. 1 is a diagram illustrating a configuration of an image-based animal object identification system according to an embodiment of the present disclosure.

Referring to FIG. 1, the image-based animal object identification system may include an animal object identification apparatus 100 and a camera 200. In this case, the animal object identification apparatus 100 may be connected to the camera 200 by wire or wirelessly through a communication network.

According to an embodiment of the present disclosure, the animal object identification apparatus 100 may calculate a flattened feature of an animal object from an image of the animal object captured by the camera 200.

In this case, the flattened feature extracted by the animal object identification apparatus 100 may correspond to a unique mark of an animal object calculated by pre-learned artificial intelligence.

For example, the animal object identification apparatus 100 may define an external feature such as a body shape of an animal object when viewed from above, a speckle pattern of a specific region of the back of an object, or a shape of an ear (body part), wrinkles that may be identified in a specific body, as a flattened feature.

In addition, the animal object identification apparatus 100 may generate cluster data by clustering a plurality of flattened features and assigning an identifier of an animal object to a cluster having similar features.

Thereafter, the animal object identification apparatus 100 calculates a flattened feature from an input image captured by the camera 200 and compares the flattened feature with pre-generated cluster data to assign an identifier to the animal object.

According to an embodiment of the present disclosure, the camera 200 may include an imaging apparatus for imaging an animal object. In this case, the animal object may include at least one animal object, and the number of animal objects imaged by the camera 200 may or may not be fixed depending on a location or situation in which the animal objects are imaged. For example, while the number of animal objects to be imaged in a pig house is fixed when the camera 200 directly captures an image of the pig house, one camera 200 may not image all regions in a ranch when the camera 200 captures an image of the ranch, and thus, the number of animal objects may not be fixed.

In this case, as long as the technology disclosed in the present specification is implemented, the specification of the camera 200 may include any specification such as a two-dimensional camera, a three-dimensional camera, and a thermal imaging camera. Accordingly, as long as the camera 200 meets the minimum specification in implementing technology, the type of the camera 200 does not limit the scope of the present disclosure. In this case, in an additional embodiment, the camera 200 may be excluded from the system, and data previously generated by other imaging apparatuses may be used for an input image.

In addition, the communication network refers to a communication network that provides a connection path such that data may be exchanged between the animal object identification apparatus 100 and the camera 200. The communication network may include a wired network such as a local area network (LAN), a wide area network (WAN), a metropolitan area network (MAN), or an integrated service digital network (ISDN), a wireless network such as a wireless LAN, code division multiple access (CDMA), the Bluetooth, or a satellite communication, and so on, but the scope of the present disclosure is not limited thereto.

Figure 2:
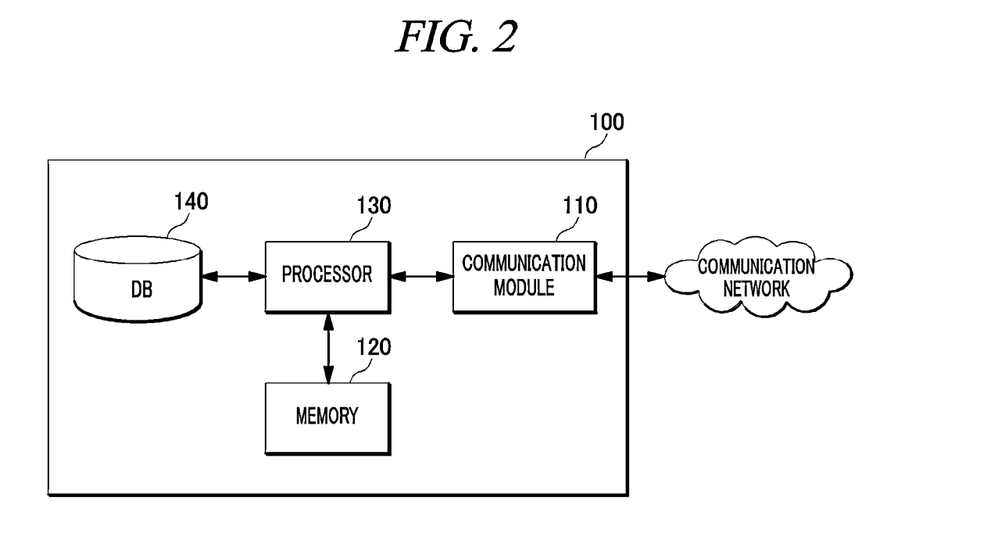
FIG. 2 is a diagram illustrating a configuration of an image-based animal object identification apparatus according to an embodiment of the present disclosure.

FIG. 2 is a diagram illustrating a configuration of the animal object identification apparatus 100 according to an embodiment of the present disclosure.

Referring to FIG. 2, the animal object identification apparatus 100 according to an embodiment of the present disclosure includes a communication module 110, a memory 120, a processor 130, and a database (DB) 140.

The communication module 110 provides a communication interface necessary to provide a transmission/reception signal between the animal object identification apparatus 100 and the camera 200 or an external computing apparatus in the form of packet data through a communication network. Furthermore, the communication module 110 may receive a data request from the camera 200 and transmit data thereto in response to the data request.

Here, the communication module 110 may include hardware and software necessary for transmitting and receiving signals such as control signals or data signals to and from other network apparatuses through wired/wireless connections.

The memory 120 stores a program for identifying an image-based animal object. In addition, the memory 120 performs a function of temporarily or permanently storing data processed by the processor 130. Here, the memory 120 may include a magnetic storage medium or a flash storage medium, but the scope of the present disclosure is not limited thereto.

The processor 130 is a kind of central processing unit and controls all processes for identifying an image-based animal object. Respective steps performed by the processor 130 are described below with reference to processes of FIGS. 3 and 4.

Here, the processor 130 may include all kinds of apparatuses capable of processing data, such as a processor. Here, the processor may refer to, for example, a data processing apparatus embedded in hardware having a physically structured circuit to perform a function represented as codes or instructions included in a program. For example, the data processing apparatus embedded in hardware described above may include a processing apparatus such as a microprocessor, a central processing unit (CPU), a processor core, a multiprocessor, an application-specific integrated circuit (ASIC), or a field programmable gate array (FPGA), but the scope of the present disclosure is not limited thereto.

The database 140 stores flattened features calculated by using input images, cluster data, and information on an identified animal object.

Although not illustrated in FIG. 2, some of the flattened features calculated by using input images, the cluster data for the flattened features, and data for the information on an identified animal object may be stored in a database (not illustrated) physically or conceptually separated from the database 140.

Figure 3:
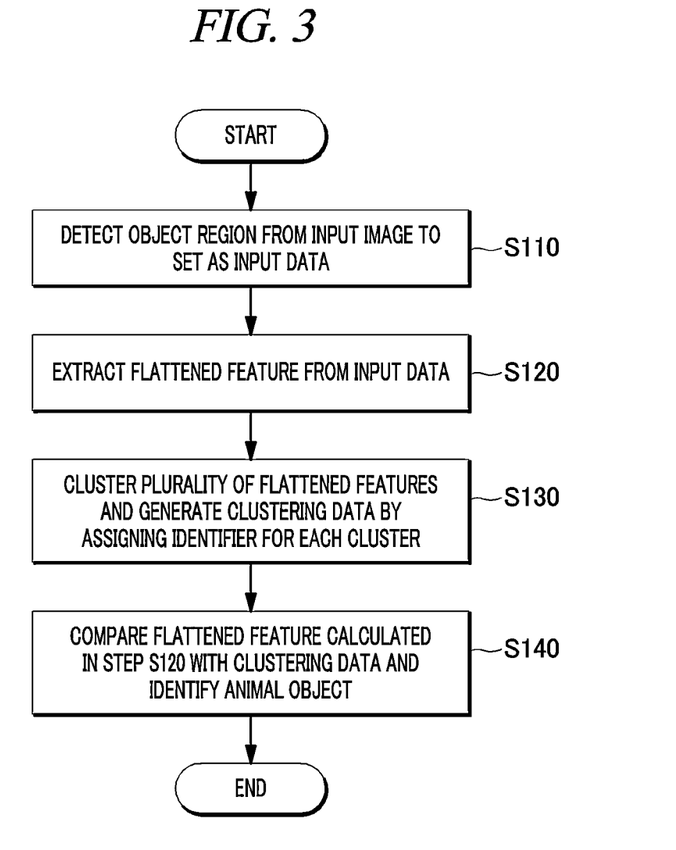
FIG. 3 is an operation flowchart illustrating a process of identifying an animal object based on an image, according to an embodiment of the present disclosure.

FIG. 3 is an operation flowchart illustrating a process of identifying an image-based animal object, according to an embodiment of the present disclosure.

Referring to FIG. 3, the animal object identification apparatus 100 may detect a specific body image of an animal object captured in an input image as an object region and set the object region as input data (S110).

Figure 5:
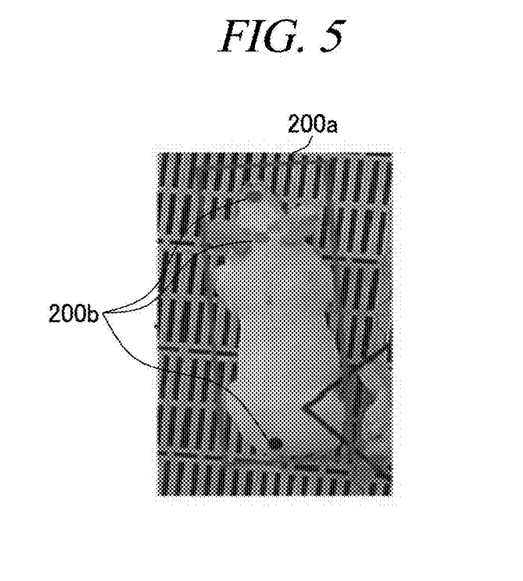
FIG. 5 is a view illustrating an example of an object region set in an animal object, according to an embodiment of the present disclosure.

In this case, as illustrated in FIG. 5, the object region may be generated by recognizing a specific body image of an animal object from an input image based on artificial intelligence and setting a segmentation.

Specifically, the animal object identification apparatus 100 may calculate an object region of one or more animal objects from an image $1_n$ of a specific frame included in an input image in the form of an equation, $L=[1_1, \ldots, 1_n, \ldots, 1_N]$. In this case, an image of the object region given to each animal object may have a rectangular shape or an elliptical shape or may have an elliptical shape or a shape of a mask of a segmentation 200a for estimating an animal shape in units of pixels.

In addition, in an additional embodiment, the animal object identification apparatus 100 may directly recognize a specific body 200b and set an object region based on a size and a shape of the specific body 200b.

In this case, at least one of Faster-RCNN, YOLO, and Mask-RCNN known in an object detection field may be applied as a specific method for detecting the segmentation 200a. However, if there is a high-performance artificial intelligence related to image recognition due to advances in technology, the high-performance artificial intelligence may be applied instead of the example described above.

Next, the animal object identification apparatus 100 may input the input data to a preset flattened-feature calculation model to extract a flattened feature from the input data (S120).

In this case, the flattened-feature calculation model may include a model for performing artificial intelligence learning based on an object region of an animal object and extracting flattened features for classifying the animal object through each object region. In this case, a process of constructing the flattened-feature calculation model is described below again with reference to FIG. 4.

Next, the animal object identification apparatus 100 may perform clustering for a plurality of flattened features and generate clustering data by assigning identifiers for classifying animal objects to at least one or more clusters (S130).

In this case, the animal object identification apparatus 100 may use two clustering technologies according to an environment in which the camera 200 is installed or whether the number of imaged animal objects is fixed in the input image.

Before describing this, the animal object identification apparatus 100 may collect multiple pieces of a flattened feature $F_n$ (300b) for each animal object, which are collected for a certain analysis time (T frame) from the input image.

Figure 7:
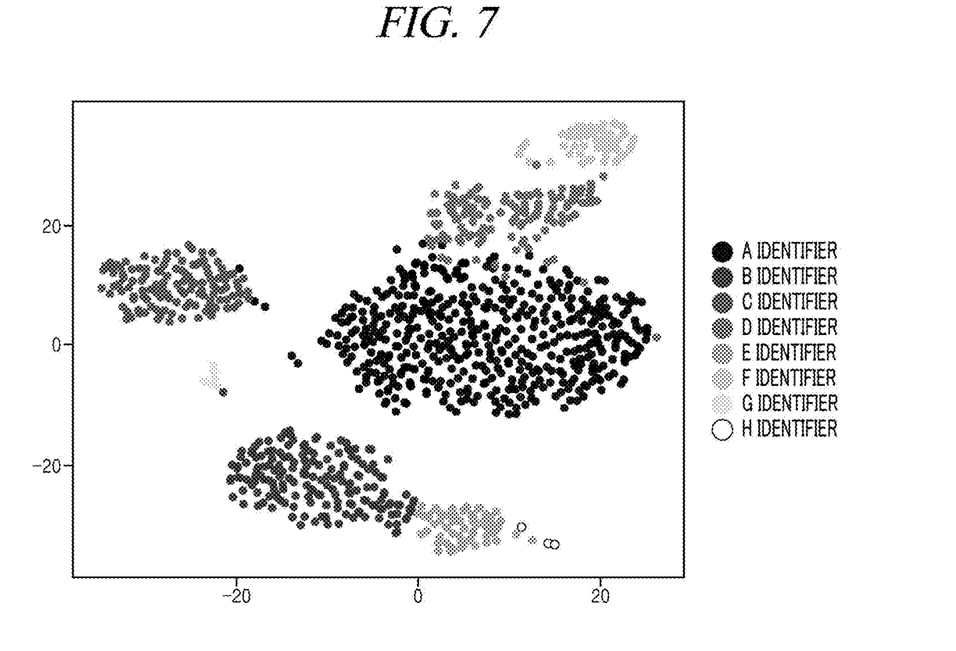
FIG. 7 is an example graph illustrating clustering of flattened features, according to an embodiment of the present disclosure.

In addition, as illustrated in the graph illustrated in FIG. 7, the animal object identification apparatus 100 clusters similar flattened features $F_n$ (300b). For example, in the graph illustrated in FIG. 7, points classified with the same color may be flattened features corresponding to a plurality of object regions collected from the same animal object. In addition, identifiers (for example, an identifier A to an identifier H, and so on) for distinguishing animal objects are given to respective clusters.

In this case, the reason that the same animal object has a plurality of flattened features is that a shape of the same specific body 200b may vary on a screen as the same animal object imaged by the camera 200 moves.

In this case, in a clustering process performed by the plurality of flattened features, it is possible to determine whether each flattened feature is calculated from the same animal object by comparing distances $D(F_n, F_m)$ between different flattened features. In the process, a distance measurement function D(A,B) may be calculated by using functions such as a Euclidean distance, a cosine distance, and a Mahalanobis distance.

In an optional embodiment, when the number of animal objects imaged in the input image is determined, the animal object identification apparatus 100 may perform clustering through k-means clustering. This means that in an environment where a management region of the camera 200 is limited, the number of animal objects being managed is fixed to K, and the animal object identification apparatus 100 may calculate K center values Ck corresponding to each animal object by performing the k-means clustering.

In another optional embodiment, when the number of animal objects imaged in a video image is not determined, the animal object identification apparatus 100 may perform clustering through the mean-shift clustering. This may be applied when the management region of the camera 200 is an open environment and the number of animal objects being managed is randomly imaged by the camera 200. In this case, the animal object identification apparatus 100 may automatically calculate one or more center values by performing mean point movement clustering. Accordingly, the total number of animal objects may be calculated differently each time according to distribution of $F_n$ (300b).

In a further embodiment, an identifier assigned to each cluster may be randomly set by a manager (for example, an animal object manager) using an apparatus to be implemented in the present disclosure. Through this, an identifier that a manager sets to the animal object classified by the apparatus is given to data, and thus, the manager may easily identify each animal object.

Finally, the animal object identification apparatus 100 may compare the flattened feature calculated in step S120 with the clustering data and may assign the identifier to the animal object included in the input image (S140).

Specifically, the animal object identification apparatus 100 may measure a distance between the flattened feature $F_n$ (300b) of an animal object in an input image and the center value Ck of each cluster included in the clustering data previously calculated to calculate which cluster each flattened feature calculated from the input image belongs to. In this case, the flattened feature and the clustering data may be compared with each other by Equation 1 below.

$$r_n = \arg\min_k(D(C_k, F_n))$$ Equation 1

In this case, an identifier of an animal object to which the flattened feature $F_n$ (300b) belongs may be assigned by calculating an index $k=r_n$ from the center value Ck of a cluster closest thereto.

That is, the animal object identification apparatus 100 may set, as an identifier for the input data, an identifier of a cluster with the highest similarity within a threshold among similarities between a flattened feature included in clustering data and the flattened feature calculated in step S120.

In addition, in another optional embodiment, when the similarity between the flattened feature included in the clustering data and the flattened feature calculated in step S120 exceeds a threshold value, the animal object identification apparatus 100 may generate a new identifier for input data and generate a cluster of flattened features based on the identifier.

In addition, in a further embodiment, an input image different from the input image used in step S110 may be used as the flattened data used as a comparison value of clustering data in step S140. Specifically, one of different input images obtained by capturing the same animal object may be used for learning and the other may be used for recognition of the animal object.

Figure 4:
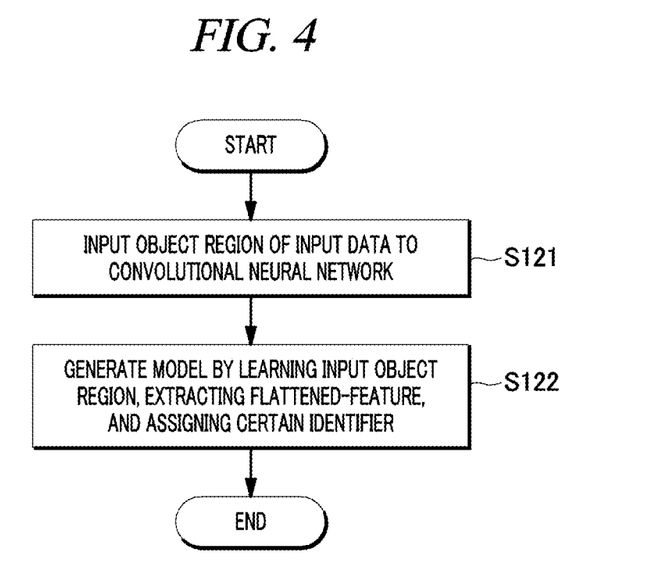
FIG. 4 is an operation flowchart illustrating a process of constructing a flattened-feature calculation model, according to an embodiment of the present disclosure.

FIG. 4 is an operation flowchart illustrating a process of constructing a flattened-feature calculation model, according to an embodiment of the present disclosure.

Referring to FIG. 4, the animal object identification apparatus 100 may input an object region for each frame included in input data to a convolutional neural network (CNN) (S121).

Prior to step S121, the animal object identification apparatus 100 may separately extract a specific body image I ($l_n$) of an animal object of an n-th frame from among the entire image region constituting an input image and use the specific body image I as an object region.

Next, the animal object identification apparatus 100 may construct a flattened-feature calculation model that extracts a flattened feature corresponding to an object region for each frame and infers a certain identifier for each animal object (S122).

Figure 6:
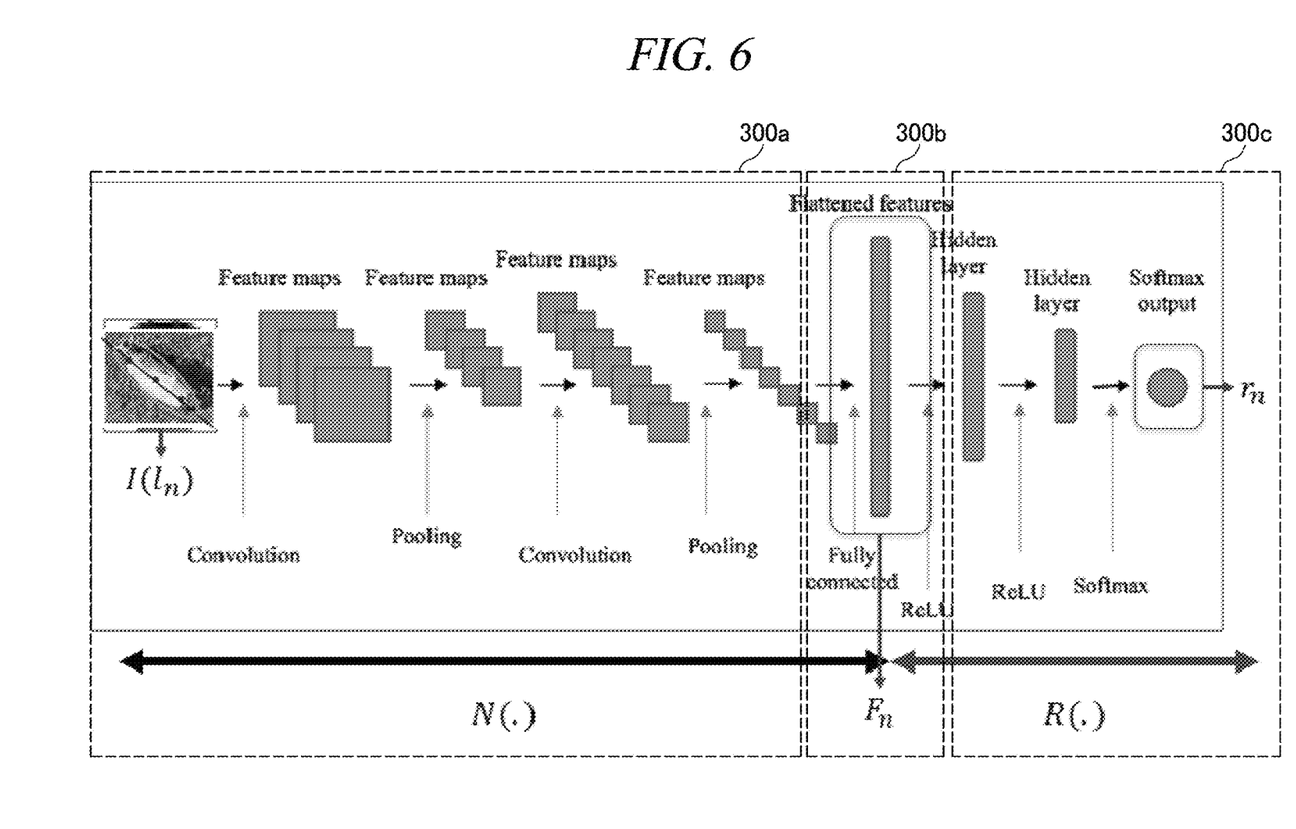
FIG. 6 is an example diagram illustrating a processing process of an artificial intelligence model for calculating flattened features, according to an embodiment of the present disclosure.

As illustrated in FIG. 6, in step S122, the animal object identification apparatus 100 may convert the flattened feature $F_n$ (300b) of the n-th animal object by passing through a neural network N(•) (300a) that extracts features for each n-th object region as represented by Equation 2.

$$F_n = N(I(l_n))$$ Equation 2

In this case, the animal object identification apparatus 100 prepares multiple object regions for an animal object of the same species for learning of N(•) (300a) (in this case, each animal object is prepared separately). In the present specification, it may be recommended to set about 10 to 100 animal objects for learning and to prepare about 10 to 100 object regions for each animal object.

In addition, the secured learning dataset may be used to configure a neural network that infers a unique identifier for each animal object after passing through several layers of convolutional neural network (CNN). The configuration of the neural network may be configured in the form of R(N(•)) by passing through a flattened-feature extraction neural network and the neural network R(•) (300c) that derives a certain identifier thereafter, and learning may proceed.

In the learning process, the animal object identification apparatus 100 may end the learning when a loss value of a loss function between a correct answer identifier and an estimated identifier among random identifiers assigned to a specific body image for each frame is less than or equal to a preset threshold.

In this case, the animal object identification apparatus 100 may calculate the loss value by applying any one of categorical cross-entropy loss, focal loss, and additive angular margin loss that may be used for multiclass classes to a loss function between the correct answer identifier and the estimated identifier.

After learning of a neural network is completed, the animal object identification apparatus 100 uses only R(N(•)) to N(•) (300a) and the flattened feature $F_n$ (300b) (that is, a flattened-feature calculation model does not use the neural network R(•) (300c) that derives a certain identifier other than the learning process).

An embodiment of the present disclosure may be implemented in the form of a recording medium including instructions executable by a computer, such as a program module executed by the computer. A computer-readable recording medium may be any available medium that may be accessed by a computer and include both volatile and non-volatile media and removable and non-removable media. In addition, the computer-readable recording medium may include a computer storage medium. The computer storage medium includes both volatile and non-volatile media and removable and non-removable media implemented by any method or technology for storing information such as computer readable instructions, data structures, program modules, or other data.

Although the method and system according to the present disclosure are described with reference to some embodiments, some or all of components or operations thereof may be implemented by using a computer system having a general-purpose hardware architecture.

The above descriptions on the present disclosure are examples, and those skilled in the art to which the present disclosure belongs may understand that the examples may be easily modified into other specific forms without changing the technical idea or essential features of the present disclosure. Therefore, it should be understood that the embodiments described above are illustrative in all respects and not restrictive. For example, each component described as a single type may be implemented in a distributed form, and likewise components described in the distributed form may be implemented in a combined form.

The scope of the present disclosure is indicated by the following claims rather than the detailed description made above, and all changes or modifications derived from the meaning and scope of the claims and their equivalent concepts should be interpreted as being included in the scope of the present disclosure.

According to an embodiment of the present disclosure, a system for identifying an animal object imaged by a camera through artificial intelligence is provided. Specifically, the system calculates and clusters imaged features of a specific body of an animal, and then compares the imaged features of an animal body with clustered data, thereby identifying the animal.

According to the embodiment, the system may identify animals based on their appearances, even when animals of the same species are clustered in a specific region.

What is claimed is:

1. An animal object identification apparatus based on an image, comprising:
    a memory storing a program for identifying an animal object based on the image; and
    a processor configured to identify the animal object based on the image by executing the program stored in the memory,
    wherein the processor detects specific body images of animal objects imaged in an input image as object regions to set the specific body images as input data, extracts flattened features for the input data by inputting the input data to a preset flattened-feature calculation model, generates clustering data by performing clustering for the flattened features and assigning identifiers for classifying the animal objects to at least one cluster, and assigns the identifiers to animal objects included in the object regions by comparing the flattened features calculated during extracting the flattened features with the clustering data,
    the flattened-feature calculation model is a model for performing artificial intelligence learning based on the object regions of the animal objects and extracting the flattened features for classifying the animal objects through the object regions,
    wherein, before the flattened features are extracted, the object region for each frame included in the input data is input to a convolutional neural network (CNN), and the flattened-feature calculation model for extracting the flattened features corresponding to the object regions for each frame and inferring a certain identifier for each animal object is constructed, and
    wherein, in a process of constructing the flattened-feature calculation model, when a loss value of a loss function between a correct answer identifier and an estimated identifier among random identifiers assigned to the flattened features of the object regions for each frame is less than or equal to a preset threshold, learning is ended.

2. The animal object identification apparatus of claim 1, wherein the object regions are generated by recognizing the specific body images of the animal objects from the input image based on artificial intelligence and setting a segmentation.

3. The animal object identification apparatus of claim 1, wherein the loss value is calculated by applying any one of categorical cross-entropy loss, focal loss, and additive angular margin loss that is usable for multiclass classes to the loss function between the correct answer identifier and the estimated identifier.

4. The animal object identification apparatus of claim 1, wherein, in a process of generating the clustering data, when a number of the animal objects imaged in the input image is determined, clustering is performed through k-means clustering.

5. The animal object identification apparatus of claim 1, wherein, in a process of generating the clustering data, when a number of the animal objects imaged in the input image is not determined, clustering is performed through mean-shift clustering.

6. The animal object identification apparatus of claim 1, wherein, in a process of assigning the identifiers to the animal objects, an identifier of a cluster with a highest similarity within a threshold among similarities between the flattened feature included in the clustering data and the flattened feature of the input data is set as an identifier for the input data.

7. The animal object identification apparatus of claim 1, wherein, in a process of assigning the identifiers to the animal objects, when similarity between the flattened feature included in the clustering data and the flattened feature of the input data exceeds a threshold, a new identifier for the input data is generated, and a cluster of flattened features is generated based on the identifier.

8. An animal object identification method based on an image, comprising:
    detecting specific body images of animal objects imaged in an input image as object regions to set the specific body images as input data;
    inputting the object regions for each frame included in the input data to a convolutional neural network (CNN);
    constructing the flattened-feature calculation model for extracting the flattened features corresponding to the object regions for each frame and inferring a certain identifier for each animal object, before the extracting of the flattened features for the input data;
    extracting flattened features for the input data by inputting the input data to a preset flattened-feature calculation model;
    generating clustering data by performing clustering for the flattened features and assigning identifiers for classifying the animal objects to at least one cluster; and assigning the identifiers to animal objects included in the object regions by comparing the flattened features calculated during extracting the flattened features with the clustering data, wherein the flattened-feature calculation model is a model for performing artificial intelligence learning based on the object regions of the animal objects and extracting the flattened features for classifying the animal objects through the object regions, and wherein, in the constructing of the flattened-feature calculation model, when a loss value of a loss function between a correct answer identifier and an estimated identifier among random identifiers assigned to the flattened features of the object regions for each frame is less than or equal to a preset threshold, learning is ended.

9. The animal object identification method of claim 8, wherein the object regions are generated by recognizing the specific body images of the animal objects from the input image based on artificial intelligence and setting a segmentation.

10. The animal object identification method of claim 8, wherein the loss value is calculated by applying any one of categorical cross-entropy loss, focal loss, and additive angular margin loss that is usable for multiclass classes to the loss function between the correct answer identifier and the estimated identifier.

11. The animal object identification method of claim 8, wherein, in the generating of the clustering data, when a number of the animal objects imaged in the input image is determined, clustering is performed through k-means clustering.

12. The animal object identification method of claim 8, wherein, in the generating of the clustering data, when a number of the animal objects imaged in the input image is not determined, clustering is performed through mean-shift clustering.

13. The animal object identification method of claim 8, wherein, in the assigning of the identifiers to the animal objects, an identifier of a cluster with a highest similarity within a threshold among similarities between the flattened feature included in the clustering data and the flattened feature of the input data is set as an identifier for the input data.

14. The animal object identification method of claim 8, wherein, in the assigning of the identifiers to the animal objects, when similarity between the flattened features included in the clustering data and the flattened features calculated in the assigning of the identifiers exceeds a threshold, a new identifier for the input data is generated, and a cluster of flattened features is generated based on the identifier.

15. A non-transitory computer-readable storage medium storing:

a program for performing the animal object identification method based on the image according to claim 8.

* * * * *